United States Patent

[11] 3,539,137

| [72] | Inventor | John J. March |
| --- | --- | --- |
| | | Colt's Neck, New Jersey |
| [21] | Appl. No. | 722,519 |
| [22] | Filed | March 25, 1968 |
| | | Continuation-in-part of application Ser. No. 586,505, Oct. 13, 1966. |
| [45] | Patented | Nov. 10, 1970 |
| [73] | Assignee | Birma Products Corporation |
| | | Sayreville, New Jersey |
| | | a corporation of New York |

[54] PIPE SADDLE
14 Claims, 11 Drawing Figs.

[52] U.S. Cl. .................................................... 248/62,
138/107, 138/141; 156/222, 156/268; 248/58
[51] Int. Cl. ...................................................... F16l 3/12,
F16l 59/02, F16l 59/08
[50] Field of Search........................................... 248/49, 58,
62; 138/106, 107, 141, 147, 149; 156/222, 268;
161/Glass Fabric Digest

[56] References Cited
UNITED STATES PATENTS

| 2,280,249 | 4/1942 | Meyer | 156/222 |
| --- | --- | --- | --- |
| 2,552,124 | 5/1951 | Tallman | 161/Glass Fabric UX |
| 2,600,843 | 6/1952 | Bush | 161/Glass Fabric UX |
| 2,891,749 | 6/1959 | Heverly | 248/49 |
| 2,962,402 | 11/1960 | Sweeney | 138/141 |
| 3,000,433 | 9/1961 | Kemper | 138/147 |
| 3,122,346 | 2/1964 | Seiler | 248/62 |
| 3,244,388 | 4/1966 | Coffman | 248/62 |
| 3,336,951 | 8/1967 | Huelster | 138/141X |
| 2,405,330 | 8/1946 | Ryder | 248/62UX |
| 3,185,758 | 5/1965 | Litz | 248/62X |
| 3,233,699 | 2/1966 | Plummer | 138/141X |

*Primary Examiner*—Roy D. Frazier
*Attorney*—Ostrolenk, Faber, Gerb and Soffen

ABSTRACT: This invention teaches a pipe saddle assembly comprised of a rigid steel or plastic elongated member having a substantially semicircular cross section. A sheet of plastic back foil is placed in the interior surface of the saddle member and a laminated core, preferably of glass fiber material of a suitable thickness is provided upon the plastic back foil member. All parts are laminated to one another and may be employed to position and support sections of pipe or pipe runs. The saddle assembly may be comprised of a similar section without the foil sheet positioned upon a lower half-section so that the foil sheet may cover the upper section and be fixedly held in place by suitable straps. A novel method for producing such a saddle assembly is also disclosed.

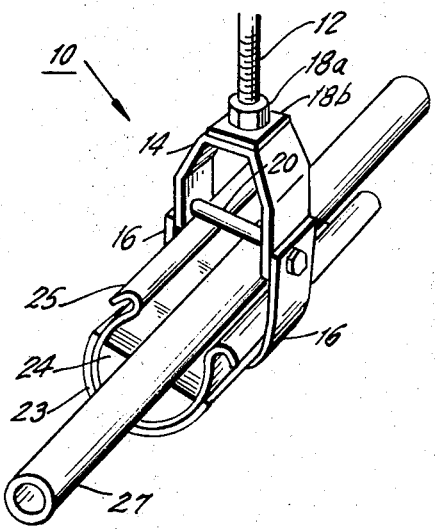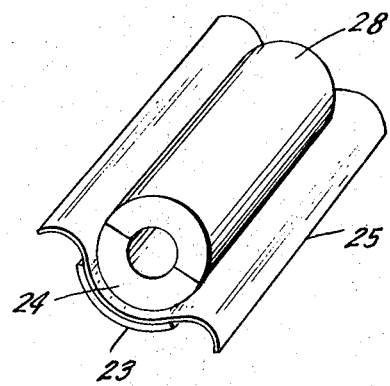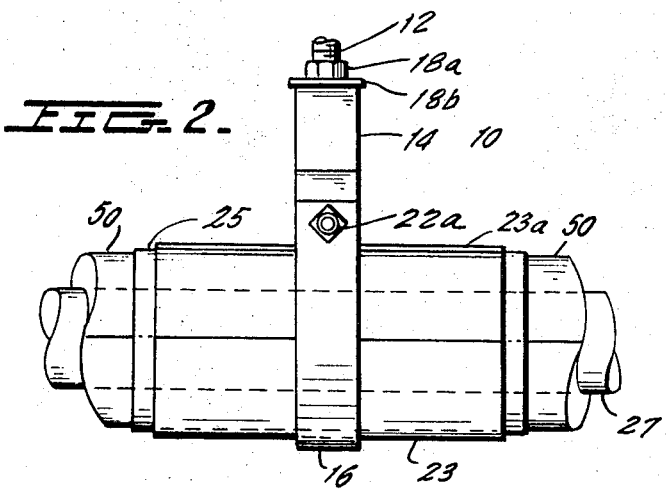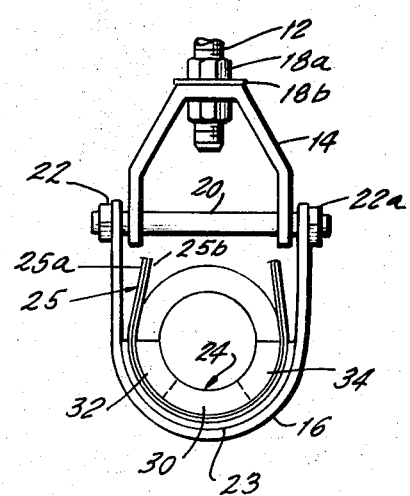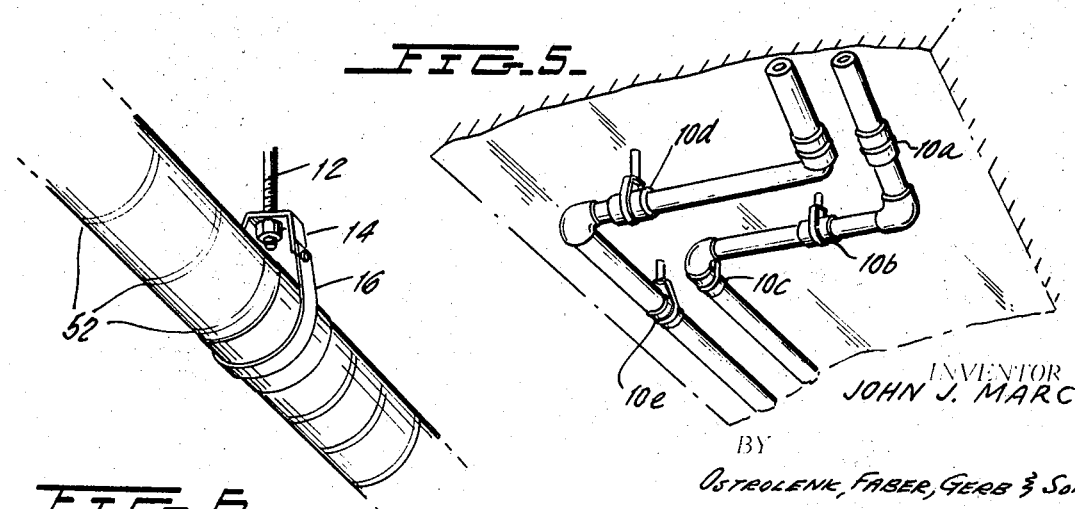

INVENTOR.
JOHN J. MARCH
BY
OSTROLENK, FABER, GERB & SOFFEN
ATTORNEYS

PIPE SADDLE

This application is a continuation-in-part application of copending U.S. application Ser. No. 586,505 entitled Pipe Saddle, filed Oct. 13, 1966 by John J. March now abandoned.

The instant invention relates to pipe insulation and supporting means, and more particularly to a combination pipe support and pipe insulation structure incorporating a vibration isolation control member having advantageous thermal and acoustical properties for providing the above mentioned functions.

Conventionally, in long horizontal pipe runs, it has been necessary to support the pipe by means of spaced pipe hangers. In the event that the pipe required thermal or acoustical insulation, blocks were utilized to temporarily support the pipe in the pipe hangers. Such blocks would then be removed as insulation was inserted around the pipe adjacent the pipe hanger. In those cases where the pipes contain liquid material under high pressure such as 100 p.s.i., or greater, the pipe hanger provided a source of mechanical vibration which would radiate noise to all areas of the structure through the pipe especially when located in an enclosed area. It has also been necessary to provide spring hangers and/or flexible connections adjacent pumps or other noise or vibration producing devices in such installations in order to attenuate sound and vibration transmission between the pipes and supports, and vice versa.

In addition thereto, many pipe runs, due to the temperature difference between the pipe and the surrounding atmospheric conditions, or due solely to the surrounding atmospheric conditions per se, require the application of vapor barrier jacketing so as to prevent any condensation on the pipe as a result of environmental influences.

The present method of covering pipes is to use pipe covering such as glass fiber material or calcium silicate. These materials have the disadvantages of being brittle, having insufficient supporting strength, lack of compressibility and further lack the ability to absorb moisture. Also, these materials do not have the damping and isolation properties of a glass fiber segment designed in accordance with the principles of this invention.

The instant invention not only eliminates the use of temporary blocking for support of piping prior to the application of insulation but further insulates the pipe and prevents the transmission of vibration and sound from the pipe to the pipe hanger and vice versa.

The instant invention comprises a pipe hanger structure comprised of suitable means for supporting a pipe by coupling the pipe hanger to an overhead structure of suitable supporting strength. A supporting bracket positions and supports a reinforced plastic saddle or a steel saddle covered with a protective corrosion-resistant coating. A vapor barrier jacketing is secured to the saddle and an engineered support member formed of insulating material, such as, for example, a high density precompressed fiberglass support is secured to the vapor barrier jacketing. The support segment has a semicircular configuration such that its outer circumference is adapted to be fully seated within the saddle member and the inner circumference is adapted to fully seat a pipe and has characteristics and properties to provide for permanent support of the pipe. The glass fiber segment is formed of fibers of a particular diameter and a proper binder content. The segment is broken by cycling after manufacture to allow the fibers to operate in their natural state although extended many times.

The vapor barrier jacketing has dimensions suitable for covering adjacent insulating sections surrounding the pipe to be insulated, as well as being capable of fully surrounding a second semicylindrical insulating member placed upon the support segment so as to provide an effectively continuous vapor barrier and vibration control support about the entire pipe run.

Assembly steps are comprised of mounting the supporting structure, positioning and supporting an insulating member within the supporting structure, placing insulation around the adjacent sections of pipe, and then wrapping the vapor barrier jacketing around the insulation and securing it by any suitable securing structure such as steel bands, and the like.

the insulating and support structure, once put in place when the pipe is set in place, need never be moved, nor is any temporary means of support necessary as is the case with certain conventional insulating and support structures. The support segment is formed of the special high density Fiberglas, having characteristics and properties to provide permanent support for a pipe, which is an inert material unaffected by water, age, oxidation, oils, most chemicals, rodents, or mildew, resulting in a permanent insulation assembly. Its damping characteristics eliminate the use of spring hangers used for vibration control. The low "K" factor of the glass fibers insures the best insulation, eliminates heat transfer, hot spots, sweating and icing at points of support and also eliminates the need of temporary knockout blocks of wood or pieces which either are left in place permanently or require removal prior to insulating around the pipes.

The integral vapor barrier jacket is simply and effectively sealed by the insulator so as to provide a good vapor barrier for the pipe. Any vibration originating from or transmitted through the pipes from pumps, or other mechanical sources, is absorbed by the highly efficient glass fibers, and is not transmitted to supporting structures or vice versa. The support segment is preferably molded to the same thickness as the adjacent pipe insulation and, since the precompressed glass fiber does not fatigue or degenerate, it will not crush nor cause the adjoining installation to crush, nor will it damage vapor barrier jacket. The saddle which may be formed of other pretreated metal or reinforced plastic is corrosion-resistant and provides a lasting neat appearance, thus yielding a neat and very reliable, long-lasting insulating structure.

One conventional process for manufacturing pipe saddles is that of rolling an elongated sheet of glass fibers into a cylindrical tube to the interior surface of a steel saddle member. The formed glass fiber tube is then cut in half at a point above the saddle member forming the completed saddle. Obviously, the laminated metallic sheet is positioned between the steel saddle and the cylindrical shaped tube assembly before the lamination process. The fibers of the formed tubular assembly tend to arrange themselves in a serpentine fashion so that when a pipe of any significant weight is supported by the pipe saddle the weight of the pipe causes the undulating fibers as well as those fibers aligned transverse to the horizontal direction to bend over upon themselves and break under load which lead to destruction of the supporting strength of the tube. Also, those fibers aligned transverse to the horizontal direction significantly reduce the infinite spring characteristics of the segment.

The instant invention further contemplates a method for forming pipe saddles so as to overcome the disadvantages of conventional techniques. The method of forming pipe saddles is comprised of taking flat sheets of glass fiber and laying them one upon another until a suitable number is provided. The fiber diameter and bundle content are chosen to provide the proper density for the segment in order to have the dual characteristics sufficient for supporting the pipe and for acting as an infinite spring to attenuate sound and vibration transmission between pipe and support. The fibers of each sheet are oriented so that they lie substantially in the horizontal direction. The flat sheets of glass fibers are then cured in a mold with a resin binder. After curing the structure is precompressed. The precompression is performed after the molding and curing operations to break the resin binder within the glass fibers at those points where it has joined intersecting fibers to allow the fibers to function in its natural state and thereby operate as an infinite spring. Also, the cycling reduces the deleterious affect produced by fibers aligned transverse to the horizontal direction. The fibers are all arranged in horizontal layers by this method and are controlled to remain flat in the lamination operation so as to enable the saddle assembly to be employed very effectively as a shock mount in addition to providing suitable support for a pipe.

After formation of the saddle and when placed under load, the weight of the pipe impresses a shearing force upon the glass fiber laminations causing the upper ends of the glass fiber laminated section to be pulled downwardly out of shape and to distort to a point which causes ultimate destruction of the glass fiber laminations. The laminations will break the seal formed with the upper half of the saddle member destroying the vapor sealing properties of the assembly. In order to overcome these disadvantages a plurality of thin cuts arranged along radial lines are made into the laminated glass fiber sections to a depth of approximately two-thirds of the overall thickness thereof. The cuts are made after the sheets are molded into a semicircular pattern and the laminated section is then coated with a suitable low friction material which also provides a good vapor barrier for the material. The low friction coating permits the pipes to be turned upon the supporting saddle assemblies even after installation of the pipes into the saddles. This assembly provides good vibration isolation and can be used to great advantage as a shock mount.

In another preferred embodiment the steel saddle member may be replaced by a reinforce plastic shield which has been found to provided three times the strength of steel and to provide a better bond between the plastic saddle member and the core. The exterior surface of the plastic saddle member is provided with a plurality of ribs arranged in space parallel fashion transverse to the length of the saddle member to positively locate and position the metal support. The plastic saddle member will withstand heat of greater than 225°F. and yields the characteristics of having excellent resistance to oxidation as well as heat and provides a saddle member which is lighter in weight than conventional metallic members and which permits much better bonding with the glass fiber cooler elements.

It is therefore one object of the instant invention to provide a novel vibration control structure for both the support and insulation of pipe runs.

Another object of the instant invention is to provide a novel insulation structure for the support and insulation of pipe run and which is comprised of a reinforced plastic or steel saddle, a vapor barrier jacketing secured to the saddle and a support segment for insulating and supporting the pipe section coming in contact with the support segment without being subjected to crushing.

Still another object of the instant invention is to provide a novel insulation structure for the support and insulation of pipe runs and which is comprised of a reinforced plastic or steel saddle, a vapor barrier jacketing secured to the saddle and a support segment for insulating and supporting the pipe section coming in contact with the support segment without being subjected to crushing and wherein the vapor barrier jacketing has dimensions suitable for completely encasing the insulating and support segments as well as adjacent sections of pipe insulation to provide a continuous, effective vapor barrier enclosure.

Another object of the instant invention is to provide a novel method for forming pipe saddles comprised of preforming uncured glass fibers, stacking the layers one upon the other and pressing these layers into a mold to be cured with the fibers oriented in such a way as to prevent breaking thereof when under load.

Still another object of the instant invention is to provide a novel pipe saddle for use in positioning and supporting pipe runs in which the resilient insulating core of the saddle member is provided with a plurality of very thin cuts extending into the core to a depth of approximately two-thirds the thickness of the core with the cuts preferably being arranged substantially along the radii of the curve section to allow the bottom 90° section of the segment to perform without the stress on the fibers caused by being joined to the upper 45° section on each side.

Still another object of the instant invention is to provide a novel pipe saddle comprised of a rigid plastic saddle member which facilitates bonding with the saddle core and which is preferably provided with a plurality of spaced ribs arranged along its exterior surface for positively positioning and locating ceiling support members.

These and other objects of the instant invention will become apparent when reading the accompanying description and drawings in which:

FIG. 1 is a perspective view of a pipe support assembly having the lower half-section of the insulation structure affixed thereto.

FIG. 2 is a side elevational view of the combination pipe support and insulation member with the top section of insulation positioned thereon, and with a pipe passing therethrough.

FIG. 3 is an end view of the assembly of FIG. 2.

FIG. 4 is a perspective view showing the insulation apparatus of FIGS. 1—3 in greater detail.

FIGS. 5 and 6 are perspective views showing the support and insulation structure of the instant invention in various stages of assembly.

Figure 7:
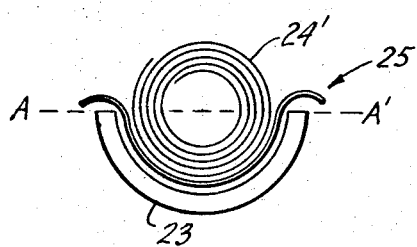
FIG. 7 is an end view useful in describing the conventional prior art method for forming pipe saddles.

Referring now to the drawings and particularly to FIGS. 1—3, there is shown therein a pipe hanger 10 which consists of a threaded shank 12, a bifurcated member 14, and a substantially U-shaped member 16. The shank 12 is adapted to be secured to a ceiling or other suitable supporting structure such as the steel supporting structure of a building, while the lower end thereof is adjustably attached to bifurcated member 14 by means of a pair of nuts 18a and a washer member 18b. The U-shaped member 16 is pivotally secured to bifurcated member 14 by means of a shaft 20 threaded at least at its opposing end portions and having nuts 22 and 22a threadedly disposed on the respective ends thereof. Although FIG. 1 shows a structure 10 for supporting a single saddle 23 and glass fiber segment 24, it should be understood that a structure similar to structure 10 may be employed to support a plurality of pipes or other conduits arranged in spaced parallel fashion.

The U-shaped member is adapted to cradle an insulating and supporting structure comprised of a substantially semicircular rigid sheet of steel or reinforced plastic commonly referred to as a saddle 23. A substantially flat but pliable sheet of vapor barrier jacketing 25 has its central portion thereof in surface contact with the interior surface of saddle 23, and adheres to the inner surface of saddle 23 through the application of a suitable adhesive material which is highly resistive to both temperature and humidity.

A semicircular section of insulation 24 provides a bed for the pipe 27 which it supports and has its outer surface secured to the inner surface of the vapor barrier jacketing sheet 25 by a suitable adhesive material.

The vapor barrier jacketing is comprised of two sheets of material which are laminated to one another. The outer sheet 25a is preferably formed of a fire-resistant material such as glass scrim on kraft paper, while the inner sheet is preferably a quilted metallic foil sheet 25b. The support segment 24 is preferably formed of a precompressed high-density glass fiber generally designated by the trademark PRESGLAS, which trademark is owned by the assignee of the instant application. The high-density material resists crushing effects of heavy loadings. The support segment is coated with a material such as rubber which has excellent resilience equal to the glass fiber and frictionless qualities. The steel saddle 23 is coated with materials such as epoxy or vinyl which have very high resistance to corrosion.

The insulation support segment 24 is adapted to substantially cover the lower half of the pipe 27. A complementally formed upper insulation section 28 is adapted to be disposed on the lower member 24 to form a complete pipe insulation cover. The exposed exterior surfaces of the insulation support member 24 is coated with the resinous, waterproof coating which is integrally bonded to the glass fibers of the material. The waterproof and protective plastic coating is applied to section 24 after securement of the section 24 to the vapor barrier jacketing. Upon curing and hardening of the coating, the steel saddle and vapor barrier jacketing become integrally bonded to one another. The upper section 28 and adjacent sections of insulation (not shown) are similarly bonded to one another and to the lower section 24 by means of a waterproof binder that effectively seals the glass fiber insulation in unitary relationship thereby providing a thermal and acoustical insulating cover that has positive vapor sealing surfaces.

The weak points in prior insulation systems utilizing conventional pipe hangers existed at the pipe hanger per se, where it was found to be extremely difficult to provide a positive insulation or vapor barrier seal. In addition, where high pressures were utilized in the pipe line being insulated, expansion or movement of the pipe line often ruptured the ineffective old-type seals. The instant invention permits this expansion without affecting the vapor seal whatsoever, and in addition thereto, isolates mechanical noise transmitted by the pipe or structure.

In assembly, the pipe supporting devices of the instant invention are mounted or otherwise secured to the building superstructure located in or near the ceiling at spaced intervals 10a through 10e, as shown in FIG. 5. The pipe is then disposed upon the lower or supporting insulation segment 24 so as to be aligned in the manner best shown in FIGS. 1—3. Pipe leakage tests may readily be performed and the insulation assembly completed without extraneous blocking and other tedious procedures employed in conventional insulation assemblies.

The upper insulation portion 28 is then mounted upon the support segment 24, as can best be seen in FIGS. 2 and 3. The insulation surrounding sections of pipe adjacent the pipe saddle locations are then secured around the pipe in any well-known fashion. After the sections immediately adjacent the insulating sections 24 and 28 are placed around the pipe, the vapor barrier jacketing 25 may then be wrapped around the insulation. FIG. 2 shows the adjoining insulation 50. The vapor barrier jacketing is of a length sufficient so as to adequately cover the marginal edges of adjoining insulation. The vapor barrier jacketing 25 is preferably wrapped around the insulation and adjacent vapor barrier jacketing of the adjoining insulation, all of which jacketing is held secure by means of steel strapping 52, as is shown in FIG. 6, which typifies a completed installation.

Although the embodiments of FIGS. 1—3 and 5 shows the saddle assembly as being supported by a structure 14—16, it is also possible to mount a metal strap around the assembly shown in FIGS. 2 and 3 and then support the assembly along vertically aligned pipe runs for providing complete vibration control regardless of pipe orientation.

The insulating sections 24 and 28 are preferably made slightly thicker than the thickness of adjacent insulating sections so as to prevent adjoining insulating sections from crushing, as well as preventing any damage to the vapor barrier jacketing. The exterior layer 25a of the jacketing is fireproof and prevents any corrosive or other effects from affecting the pipe enclosed therein. The interior layer 25b, which is preferably formed of a metallic foil material, acts as an excellent vapor barrier jacketing to prevent any vapor or moisture from entering into the region enclosed by the jacketing, thereby providing superior protection for both the enclosed pipe and the insulating sections contained therein. This arrangement eliminates "sweating" of the pipes, as well as eliminating any deterioration of the insulation material.

As another preferred embodiment, the support segment 24, as shown in FIG. 3, may be assembled from plural curved sections 30, 32 and 34. Section 30 is arcuate in shape having an arc that is substantially one-sixth of the circumference of the pipe to be supported. This section is preferably formed from a glass fiber material with a predetermined density that will adequately support a predetermined weight without undue compression or distortion thereof. Section 30 is preformed and cured so that it will retain its formed shape. Sections 32 and 34 are not subjected to the weight of the pipe and therefore may be made of glass fiber material having a lower density and compression factor. The section 24 is radially assembled wherein the sections 30, 32 and 34 are united by a waterproof binder that will withstand the heat generally generated by the pipe. The inner periphery of the assembled sections are coated with a resinous waterproof coating integrally bonded to the glass fibers. In a similar manner, an external waterproof coating is integrally bonded to the external surface of the sections 30, 32 and 34. This coating is applied to the sections after they have been adhered to the vapor barrier jacketing by a suitable adhesive material. After curing and hardening of the coating, the support segment 24 is integrally bonded to the vapor barrier jacketing 25 in the same manner as was previously described. This assembly provides a thermal and acoustical insulating assembly that has positive vapor-sealing surfaces.

It can be seen from the foregoing that the instant invention provides a novel thermal and acoustical insulating assembly for pipe runs which is easy to install, provides vibration control and adequate support for the piping, as well as a vapor barrier jacketing which is heat-resistant and fire-retardant, and which provides a long lasting performance and neat appearance. The corrosive resistant coating upon the steel saddle member 23 maintains a neat appearance for this saddle member. The absorption qualities of the highly efficient glass fibers absorbs vibration transmitted through the piping from pumps and other mechanical sources and prevents this vibration from being transmittted to the supporting structures.

In certain demanding applications the upper portion of pipe installation 28 may be provided with a steel saddle member 23a for use in applications where a highly effective shock mount is required. Such installations have been employed in underground coaxial power field buildings which are underground stations. This application imposes great stress upon the piping thereby requiring the shock mount assembly arrangement as shown in FIG. 3. The upper insulating portion 28 in this case is preferably formed of the same highly efficient high-density precompressed glass fibers as the lower support segment 24. The density of the support segment lies within the range of 8 to 18 lbs. per cubic foot. In this range the thermal conductivity factor K varies between .24 and .26 at 75°F. mean, depending on the density of the glass fiber support segment. The installations have been found to provide extremely effective results in applications through temperature ranges from −100°F. to +400°F., and have been capable of application for design load limits of up to 3340 pounds. Moisture absorption of the completed assembly has been found to be so small as to be immeasurable. The water vapor permeability of the structure has been found to be as small as 0.01 perms due to the application of the vapor barrier jacketing. The vibration isolation efficiency is in the range from 85—95 percent based on static deflection of 10—20 percent of free height of support segment and a disturbing frequency of 1750 r.p.m.

FIG. 7 shows the conventional method for forming pipe saddles. The method is comprised of the steps of taking an elongated sheet of glass fiber material and rolling it into cylindrical form so as to form the cylindrical assembly 24'. The laminated metallic sheet 25 is positioned between the rigid saddle member 23 and the cylindrical assembly 24'. The three elements 23, 24' and 25 are then laminated to one another. After the lamination procedure is completed the cylindrical assembly 24' is cut along the dotted line A-A' to form the completed pipe saddle assembly.

When pipe saddle assemblies are formed using this conventional method, it is found that the fibers 24a of the layers 25 of glass fiber material (only two such layers being shown in FIG. 7a) are caused to bend or curve so as to form a serpentine or undulating pattern. When the pipe supported by this saddle is placed within the saddle, these fibers tend to bend over under load and will break under load, thereby destroying the strength of the insulations section 24.

Figure 7A:
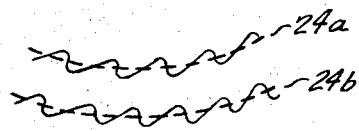
FIG. 7a is a detailed end view showing the manner in which the fibers are formed in serpentine fashion when pipe saddle assemblies are formed using the method shown in FIG. 7.
Figure 8:
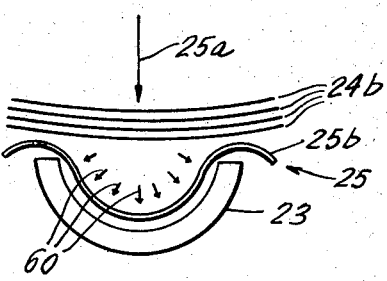
FIG. 8 is an end view showing the manner of forming a pipe saddle in accordance with the principles of the instant invention.

In order to overcome the disadvantages of the conventional method of production, pipe saddle assemblies may be formed in accordance with the method as shown in FIG. 8. As shown therein, a laminated foil sheet 25 is positioned upon a rigid saddle member 23. The glass fiber segment, before being mounted upon the sheet is formed by stacking a plurality of flat glass fiber sheets 24b one upon the other, the total amount being sufficient in number to provide a core of suitable thickness and density. The sheets are then pressed into a mold (not shown) together with a resin binder. The sheets and binder are heated in the mold under pressure. After curing, the structure is precompressed or alternatively cycled through repetitive application and release of pressure to break the binder allowing the fibers to operate in their natural state as an infinite spring. Conventionally, spring hangers and/or flexible connections are employed to insulate the piping system as well as requiring other special methods of support for a pipe at the pipe hanger. With the above method, the fibers are caused to remain in horizontal layers and are prevented from forming in an undulating pattern as shown in FIG. 7a. All of the fibers are laid substantially in parallel arrangement in a horizontal direction such that the fibers of each sheet as well as the fibers of adjacent sheets are all substantially arranged in parallel fashion. The sheets are then placed in a mold having the desired semicircular configuration. A resin binder is placed in the mold with the sheets and the elements are heated under pressure in order to cure them. As was mentioned above, the cured segment is then cycled through the repetitive application and removal of pressure to break the resin (which is preferably a thermo setting type resin) and allow all the fibers to act in their normal manner so as to form an infinite spring to thereby attenuate the transmission of both sound and vibration from pipe to pipe supporting structure and vice versa. Preferably, the thickness of the fibers (fiber diameter lies in the range from .00022 to 0.00012 inch. Although the length of fiber is not critical, the fibers normally employed are usually of three-fourths inches in length and can be in the range from one-fourth inch up to more than 1 inch. Thus, the strength of any one layer is not harmfully affected under load and the saddle member can be employed to good advantage as a vibration isolator in addition to providing positioning and supporting strength for a pipe run. The compression of the segment after curing breaks the set of the binder at those points where fibers intersect one another and further significantly reduces the deleterious effect on springness caused by fibers transversely aligned to the horizontal direction by crushing those fibers. The glass fiber segment is secured to the saddle member by a suitable adhesive. The individual fibers are aligned relative to the saddle member so that the fibers assume the curve of the saddle.

Figure 8A:
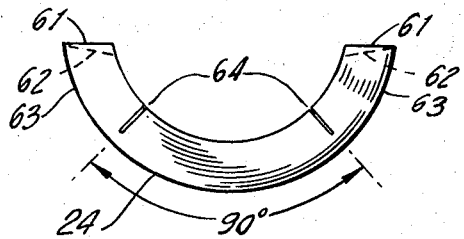
FIG. 8a is an end view showing the manner in which a core is provided with a plurality of cuts for the purpose of preventing shearing of the core under load.

Considering FIG. 8a, when the core 24, shown therein, is provided in the saddle assembly it is found that the layers forming the core 24 will shear under load so as to pull the corners of the core 24 downwardly until they are deflected to the position shown by dotted line 62. This ultimately causes the exterior surface portion 63 to break away from the saddle assembly and thereby destroy the vapor seal provided by the pipe saddle assembly. This shearing strength also will cause the layers of laminations to shear or break away from one another and hence destroy the supporting strength of the core.

In order to overcome this disadvantage, the core 24 is provided with a plurality of thin cuts 64 which are arranged substantially along radial lines spaced approximately 90° apart and which penetrate into the core by a depth substantially equal to two-thirds the overall thickness of the core. Whereas any suitable number of cuts may be provided, it has been found that all shearing under load may be eliminated with the inclusion of as few as two cuts arranged substantially in the position of the cuts 64, 64. Other suitable arrangements are spacing the cuts at 30° intervals (using four cuts) or at 120° intervals (using two cuts). The cuts made in the core 24 are formed after the sheets are molded into their semicircular pattern. The cuts are made by a very thin blade so as not to provide voids in the segment. The finished assembly provides excellent vibration isolation and can be used advantageously as a shock mount. The cuts allow the center segment to perform without stress on the fibers positioned above the cuts 64, 64.

Figure 8B:
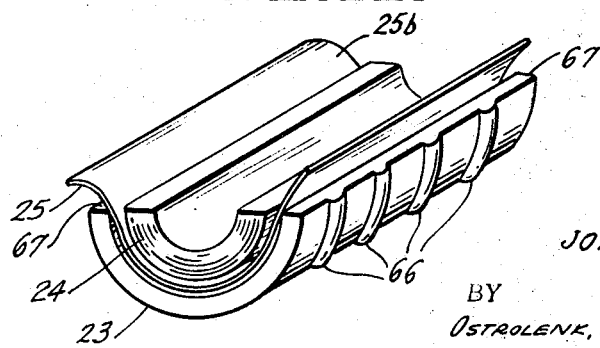
FIG. 8b is a perspective view of another preferred embodiment of the invention.

FIG. 8b shows still another preferred embodiment of the instant invention wherein the saddle member 23 is a reinforced plastic shield which is of much lighter weight than the steel saddles previously described and yet having three times the strength of steel. The rigid plastic saddle member 23 also provides a better bond between the plastic and the core. The exterior surface of the rigid plastic saddle is provided with a plurality of ribs 66 which are arranged in spaced parallel fashion to positively locate the metal support 16, as shown in FIGS. 1—3, 5 and 6. The interior surface of the rigid plastic saddle is smooth and the sheets are molded thereto in a perfect semicircle. The foil laminating sheet 25 has a vinyl reinforced backing 25b (FIG. 3) which has excellent punctureproof resistance. The foil member is also washable. The rigid plastic saddle member is capable of withstanding temperatures of greater than 200°F. and has excellent resistance to oxidation, heat and flame. The saddle member is preferably formed of thermo setting resins having high strength characteristics and excellent chemical resistance. These resins are formulated to be flame resistant and contain glass fiber for reinforcement and maximum strength.

The interior edges 67 of the rigid saddle member are preferably rounded to prevent any scouring or other damage to adjacent insulation covering the pipe run. The support segment is coated with a material which has the slip quality to allow the pipe which it supports to be selectively turned making it possible to weld the pipe joint in place right at the site. This coating is designed to have the same resilience as the glass fibers and further acts to prevent the glass fiber segment from picking up moisture.

I claim:

1. A combination pipe isolation and supporting and pipe-insulating assembly comprising, in combination:
   an arcuate rigid saddle;
   a pliable vapor barrier jacket having a central portion thereof secured to the inner surface of said saddle;
   a preformed arcuate section of insulation material having thermal and acoustical qualities and having an inner peripheral radius substantially equal to the external radius of the pipe to be supported thereby;
   an outer plastic coating and an inner plastic coating on said section, said section being secured to the inner surface of said vapor barrier jacket to form with said jacket a holding support for said saddle and an integrated support for a pipe cradled by said section in predetermined pipe supporting relation and said section being adapted to cooperate with a similar arcuate section of insulating material to substantially enclose the supported pipe therein in insulating relation;
   said vapor barrier jacket being wrapped around said preformed section to provide an effective vapor seal for the assembly; and
   wherein said preformed arcuate section is of the form of a semi-circular member including a plurality of arcuate coaligning sections, one of said sections having glass fibers therein preformed with a specific density to support a pipe of predetermined weight, and with the others of said sections having glass fibers therein preformed with a lesser specific density, and wherein there is also included means to secure the others of said sections to said one section in unitary arcuate relation.

2. The assembly of claim 1 wherein there is additionally included a pipe hanger including a U-shaped pipe-supporting member for cradling said insulation section, vapor barrier jacket and supported saddle assembly and adjustable means for securing said U-shaped member to an overhead surface.

3. The assembly of claim 1 further comprising strap means for securing the vapor barrier jacket about the exterior of the assembly.

4. The assembly of claim 1 wherein said saddle is provided with a corrosive resistant coating.

5. The assembly of claim 1 wherein said vapor barrier jacket is comprised of an exterior layer of fire-retardant material and an inner layer of a metallic foil material.

6. The assembly of claim 1 wherein there are further included said similar arcuate insulation section and a second arcuate rigid saddle positioned about said similar arcuate insulation section for providing a rigid shock mounting entirely surrounding the enclosed pipe.

7. The assembly of claim 1 wherein said insulation section, vapor barrier jacket and supported saddle assembly are coated with a resinous waterproof coating over the exposed surface areas thereof.

8. The assembly of claim 1 wherein said saddle is provided with a plurality of ribs on its exterior surface arranged in spaced parallel fashion for positively positioning a supporting bracket member.

9. The assembly of claim 1 wherein said arcuate section of insulation material is provided with at least two cuts formed in the interior section of said arcuate section of insulation material arranged substantially along radial lines and each extending into said section to a depth of the order of two-thirds of the thickness of the arcuate section to prevent shearing of said arcuate section under load.

10. The assembly of claim 1 wherein said arcuate section of insulation material is comprised of a plurality of glass fiber sheets wherein the fibers of all of said sheets lie substantially in one general direction;

said section further including a thermo setting resin whose setting has been broken to allow the arcuate section fibers to operate in their natural state although extended many times for the attenuation of sound and vibration transmission between the pipe which it supports and the structure supporting the pipe-supporting and pipe-insulating assembly.

11. A method for forming a pipe saddle assembly comprising the steps of:

forming a curved rigid saddle member from a suitable plastic material so as to form an elongated member having a substantially semicircular cross section;

placing a vinyl reinforced foil sheet upon said semicircular saddle member with the foil surface making engagement with the interior surface of said saddle member;

stacking a plurality of flat glass fiber sheet one upon the other to form a stack of predetermined height;

curing said stack of sheets together with a thermosetting resin under pressure in a mold;

joining the cured stack of said sheets to said saddle member to form an integrated support for a pipe adapted to be cradled by said stack of sheets; and forming a plurality of cuts in the interior surface of said laminated stack of sheets with said cuts being aligned substantially along radii of said rigid saddle member to prevent shearing of said laminated stack under load.

12. The method of claim 11 further comprising the step of providing a plurality of spaced parallel ribs along the exterior surface of said rigid saddle member.

13. The method of claim 11 wherein the curing step is further comprised of the step of applying pressure to the cured assembly in order to break the thermosetting resin.

14. The method of claim 11 wherein the step of stacking said sheets is further comprised of aligning the fibers of each sheet so as to substantially lie in a single direction.